United States Patent
Vedantham et al.

(10) Patent No.: US 8,830,868 B2
(45) Date of Patent: Sep. 9, 2014

(54) KEEP ALIVE MESSAGE OVERHEAD REDUCTION FOR COMMUNICATION NETWORKS

(75) Inventors: Ramanuja Vedantham, Allen, TX (US); Kumaran Vijayasankar, Dallas, TX (US); Ram Krishnan, Carrboro, NC (US)

(73) Assignee: Texas Instruments Incorporated, Dallas, TX (US)

( * ) Notice: Subject to any disclaimer, the term of this patent is extended or adjusted under 35 U.S.C. 154(b) by 121 days.

(21) Appl. No.: 13/473,359

(22) Filed: May 16, 2012

(65) Prior Publication Data

US 2013/0194965 A1 Aug. 1, 2013

Related U.S. Application Data

(60) Provisional application No. 61/592,346, filed on Jan. 30, 2012.

(51) Int. Cl.
*H04L 12/28* (2006.01)

(52) U.S. Cl.
USPC .......................................... 370/254

(58) Field of Classification Search
USPC .................................. 713/323, 320
See application file for complete search history.

(56) References Cited

U.S. PATENT DOCUMENTS

| | | | |
|---|---|---|---|
| 7,788,381 B2 | 8/2010 | Watson et al. | |
| 2012/0008536 A1 | 1/2012 | Tervahauta et al. | |
| 2013/0007484 A1* | 1/2013 | Gobriel et al. | 713/320 |
| 2013/0007495 A1* | 1/2013 | Maciocco et al. | 713/323 |

FOREIGN PATENT DOCUMENTS

WO WO 2012150473 A1 * 11/2012

* cited by examiner

*Primary Examiner* — Yemane Mesfin
*Assistant Examiner* — Derrick V Rose
(74) *Attorney, Agent, or Firm* — Steven A. Shaw; Frederick J. Telecky, Jr.

(57) ABSTRACT

A method of communications in a network having plurality of nodes including a base node (BN) and a plurality of levels (i) each including at least one service node (SN). The number (Ni(t)) of SNs registered in each of a plurality of i are determined. The current Keep Alive timer out (KA_TO) value for a KA timer at the BN is dynamically adjusted to an updated KA_TO value based on Ni(t) and i. Dynamically adjusting KA_TO values reduces the KA message overhead the network compared to known KA_TO value implementations.

19 Claims, 2 Drawing Sheets

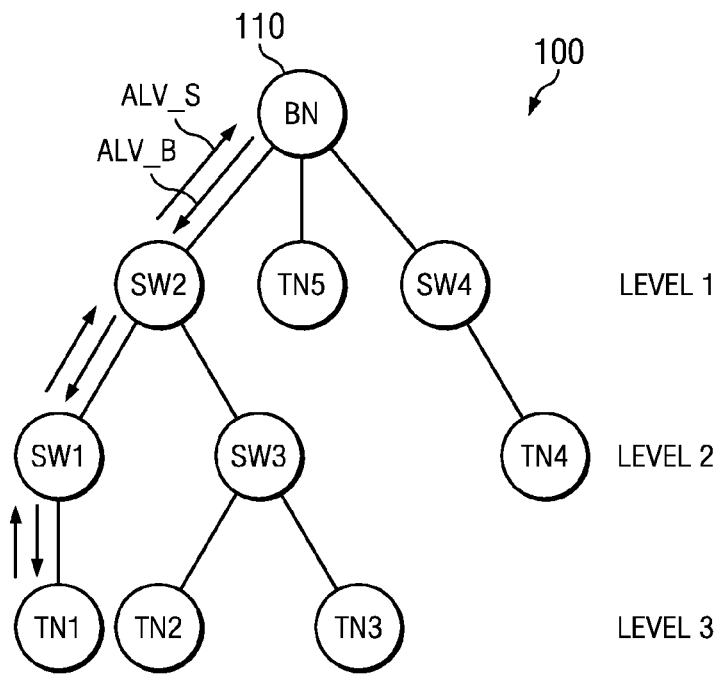

FIG. 1
*(PRIOR ART)*

METHOD 200

201 — THE NUMBER OF SERVICE NODES (SNs), Ni(t), REGISTERED IN EACH OF A PLURALITY OF LEVELS (i) EACH INCLUDING AT LEAST ONE SN NODE IS DETERMINED IN A COMMUNICATIONS NETWORK HAVING A BASE NODE (BN)

202 — DYNAMICALLY ADJUSTING A CURRENT KEEP ALIVE TIME OUT (KA_TO) VALUE FOR A KEEP ALIVE TIMER AT THE BN TO AN UPDATED KA_TO VALUE BASED ON Ni(t) AND i

203 — COMMUNICATING THE UPDATED KA_TO VALUE TO THE SNs

FIG. 2

KEEP ALIVE MESSAGE OVERHEAD REDUCTION FOR COMMUNICATION NETWORKS

CROSS REFERENCE TO RELATED APPLICATIONS

This application and the subject matter disclosed herein claims the benefit of Provisional Application Ser. No. 61/592,346 entitled "Data Concentrator Regulated Keep-Alive Traffic Adaptation in PRIME" filed Jan. 30, 2012, which is herein incorporated by reference in its entirety.

FIELD

Disclosed embodiments relate generally to the field of communications, and, more specifically, methods of node availability in communication networks.

BACKGROUND

Smart grid technology refers to ongoing improvements for the transmission and distribution of electricity from points of generation to consumers. A key component in a smart grid network is the so-called "smart-metering" network. In a typical smart-metering network, electricity (or other utility) meters located at a residency or other edifice are able to transmit the real-time meter readings through powerlines back to the power concentrators and provide valuable real-time electricity control and billing information for the electricity provider.

Due to power efficiency considerations and severe noise in powerlines, direct transmission of metering information through powerlines has limited scopes. Therefore, a typical smart metering network has a tree-like topology, including: 1) a data concentrator that serves as the root node in the tree (also called a base node, BN); 2) metering devices at terminal nodes (TNs) in the tree which send their metering readings back to the BN; and 3) switching nodes (SWs) which act as the branch nodes in the tree. The SWs relay the data traffic to the further hops for communication pairs (e.g., a TN and a BN) beyond their direct communication reach. The SWs and TNs in the network are collectively referred to herein as service nodes (SNs).

Powerline-Related Intelligent Metering Evolution (PRIME) is a European standard of smart-metering network. The PRIME standard defines lower layers of a powerline communication narrowband data transmission system for the electric power grid using Orthogonal Frequency-Division Multiplexing (OFDM) in the 42 to 90 kHz band. A PRIME network utilizes a tree-like topology as described above. In a PRIME network, the Media Access Control (MAC) function enables the BN, as well as the SWs to send out beacons periodically. The beacons also help all the SNs in the network synchronize their clocks and virtually chop the time domain into discrete time frames.

A Keep Alive (KA) procedure is used to detect whether the BN and SNs are alive. Conventional KA procedures require the BN to periodically send a KA request to every SN that is part of the network, and await a KA response from the SNs. KA frames allows the BN to detect when a SN becomes unreachable due to changes in network configuration/topology (bad link, channel conditions, load variations, SN leaving the subnetwork, etc.), or fatal errors at the SN it cannot recover from. The KA procedure is performed using timing (e.g., a particular fixed KA timeout value used) which is without regard to the number of registered SNs and their levels (depth) in the network.

FIG. 1 illustrates a powerline communications network 100 comprising a BN 110, SNs comprising as SN1-SN5, and SWs comprising SW1-SW4. Network 100 has 3 levels shown as Level 1, Level 2, and Level 3. FIG. 1 shows transmission of KA request frames by the BN 110 (ALV_B frames) for clarity to only SW1, SW2 and TN1 and the response frames from these SNs (ALV_S frames). Although the KA frames are beneficial for allowing the BN 110 to detect the connectivity of the respective SNs in the network 100, KA frames introduce additional traffic overhead in the network. It is noted that both the ALV_B and ALV_S messages are transmitted in an unicast fashion to each SN in the network 100 which further adds to network overhead.

SUMMARY

Disclosed embodiments are directed, in general, to communication networks and, more specifically, to methods, modems and communication devices which implement Keep Alive (KA) message overhead reduction. Disclosed KA message overhead reduction algorithms regulate the number of KA messages in the network by dynamically setting the KA timeout (KA_TO) value for the KA timer at the base node (BN) based on number of registered service nodes (SNs) and their levels (depth) in the network. The updated KA_TO value is then communicated by the BN to the SNs in the network, such as by using an ALV_B frame for a powerline communications network based on the PRIME standard.

KA_TO values are dynamically adjusted based on the number of SNs registered in each of the plurality of levels in the network (i), with a SN weighting that can increase as the level number increases. Disclosed KA_TO value adjustments also allow the BN to become cognizant of SN connectivity failures within a reasonable time.

BRIEF DESCRIPTION OF THE DRAWINGS

Reference will now be made to the accompanying drawings, which are not necessarily drawn to scale, wherein:

FIG. 1 illustrates a powerline communications network showing the transmission of KA frames by the BN (ALV_B) to some of the SNs in the network and responses received from these SNs (ALV_S).

FIG. 2 is a flowchart for an example KA message overhead reduction algorithm, according to an example embodiment.

DETAILED DESCRIPTION

Figure 3:
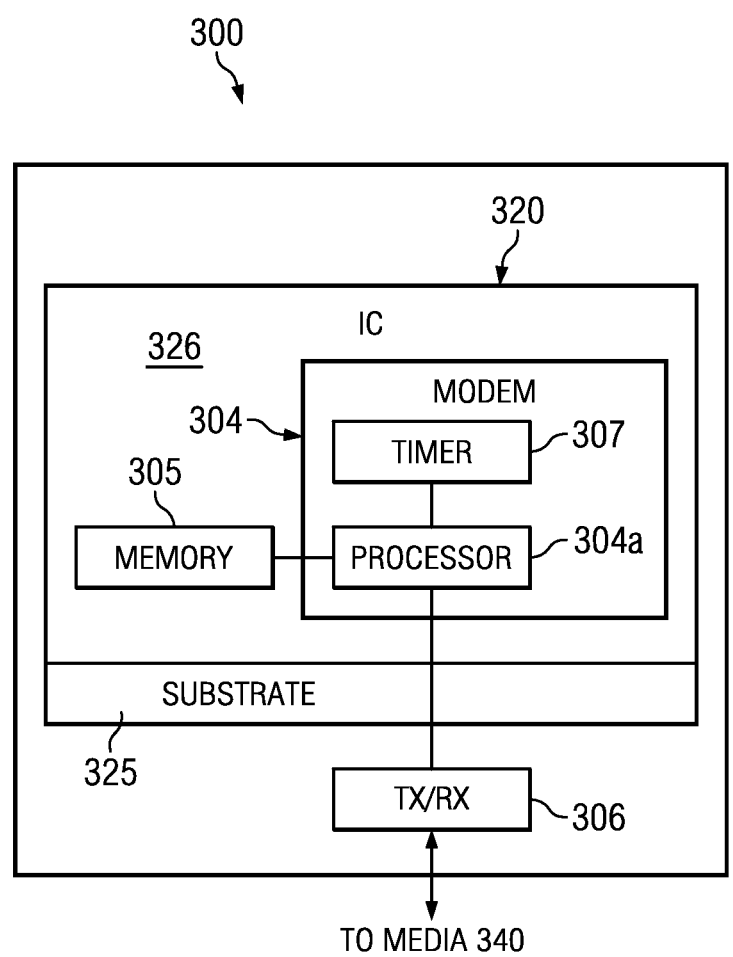
FIG. 3 shows a communication device having a disclosed modem that implements a disclosed KA message overhead reduction algorithm, according to an example embodiment.

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples", unless clarified, such as in "communicably coupled", is intended to mean either an indirect or direct electrical connection. Thus, if a first device couples to a second device, that connection may be through a direct electrical connection, or through an indirect electrical connection via other devices and connections.

FIG. 2 is a flowchart for an example method 200 of KA message overhead reduction in a communications network, according to an example embodiment. The communications network can be a wired network, such as a powerline communications network, or a wireless communications network. The network has plurality of nodes including a BN and a plurality of levels (i) each including at least one SN. In step 201 the number (Ni(t)) of SNs registered in each of a plurality of i is determined. Step 202 comprises dynamically adjusting a current KA_TO value for a KA timer at the BN to an updated KA_TO value based on Ni(t) and i. In one embodiment a sum over i of a product of Ni(t) and i ($\Sigma Ni(t)*i$) is computed and this sum of products $\Sigma Ni(t)*i$ is then compared to at least one predetermined threshold (Th) value to determine the updated KA_TO value. A minimum KA_TO value that is greater than the above sum of products is generally used.

The at least one Th value can comprise a plurality of Th values which are configured to form a plurality of Th value ranges, with each Th value range corresponding to a different candidate KA_TO value, wherein higher ones of the Th value ranges correspond to higher candidate KA_TO values. The Th values can be determined as a candidate KA_TO value*K, where 0<K<1. The minimum KA_TO value can be calculated from satisfying the equation $\Sigma Ni(t)*i \leq Th\ (KA\_TO*K)$, where 0<K<1 can be used.

The SNs in the network also each have a KA timer. Step 203 comprises communicating the updated KA_TO value to the SNs. For example, in a powerline communications network utilizing the PRIME standard, the updated KA_TO value can be sent to the SNs in an ALV.TIME field within an ALV_B frame. The network can utilize Orthogonal Frequency-Division Multiplexing (OFDM) signaling, or signaling based on other modulation techniques.

Implementations of disclosed KA algorithms can involve BN' transmission of KA requests (ALV_B) to SNs in the network up to a certain number of times prior to the KA_TO expiry. In one particular implementation, the BN attempts up to a fixed number (e.g., 3) times to get a response from a particular SN in the network. By dynamically adapting the current KA_TO value based on the registered node arrangement, the overall KA traffic in the network can be reduced while still detecting a connection loss in reasonable time. One particular example disclosed KA message overhead reduction algorithm is configured as follows:

i) A minimum KA_TO value and a maximum KA_TO value is provided, such as 32 sec and 4096 sec, respectively, in one particular embodiment;

ii) An initial KA_TO value is set, such as to the minimum KA_TO value of 32 sec, and ALV_B messages are sent by the BN to the SNs at 16 sec, and retries at 24 sec, 28 sec if needed (i.e. if an ALV_S is not received);

iii) The KA_TO value for the KA timer at the BN is dynamically adjusted as follows. The number of registered SNs in the network at any given time is maintained by the BN by the nodes registering with the BN and the BN repeatedly checking if each of the SNs are still connected by the use of KA messaging (ALV_B messaging), where the network has i levels with $N_i$ SNs at each level i. For example, in the network 100 shown in FIG. 1 which has 3 Levels, i=3 and assuming all the nodes shown are registered at a given time $\Sigma Ni*i$ from i=1 to i=3 is computed as 3(1)+3(2)+3(3)=18. If the sum of the product ($\Sigma Ni*i$) exceeds a certain predetermined threshold value, $Th_i$, then the KA_TO value for the KA timer at the BN is dynamically adjusted upward from its initial KA_TO value assumed in this particular example to be 32 sec as shown below to up to a maximum value shown as 4096 sec.

$$\Sigma Ni*i < Th1 : KA\_TO = 32\ sec$$

$$Th1 <= \Sigma Ni*i < Th2 : KA\_TO = 64\ sec$$

$$Th2 <= \Sigma Ni*i < Th3 : KA\_TO = 128\ sec$$

$$Th3 <= \Sigma Ni*i < Th4 : KA\_TO = 256\ sec$$

$$Th4 <= \Sigma Ni*i < Th5 : KA\_TO = 512\ sec$$

$$Th5 <= \Sigma Ni*i < Th6 : KA\_TO = 1024\ sec$$

$$Th6 <= \Sigma Ni*i < Th7 : KA\_TO = 2048\ sec$$

$$\Sigma Ni*i >= Th7 : KA\_TO = 4096\ sec$$

It can be seen that the KA_TO value for updating the BN's Keep-Alive timer increases when $\Sigma Ni*i$ increases, provided the current KA_TO value is not already at its maximum allowed value (shown above as 4096 sec). Similarly, when $\Sigma Ni*i$ drops below a certain threshold, the KA_TO value can be adjusted downward (assuming the current KA_TO value is above the minimum value, shown as 32 sec) using the same table shown above. The value of the threshold parameters ($Th_i$) can be left to the specific implementation. This way, the BN can regulate the total KA message traffic in the network, while still maintaining the ability to know the connectivity (registered or non-registered status) of each SN in the network.

Advantages of disclosed KA message overhead reduction algorithms include:

1. for powerline implementations, being fully PRIME standard compliant, and backward compatible with existing implementations;
2. Simple and easy to implement, generally depending only on a KA_TO value adjustment to reduce the overall network traffic, and
3. Efficient as they reduce the overall network overhead associated with KA messages without compromising the ability to know the connectivity of all SNs in the network.

FIG. 3 shows a block diagram schematic of a communications device 300 comprising a modem 304 including a processor (e.g., a digital signal processor, (DSP)) 304a having associated memory 305 comprising non-transitory machine readable storage that implements a disclosed KA loss reduction algorithm at a BN within a communications network, according to an example embodiment. The KA timer is shown as 307. The modem 304 is shown formed on an integrated circuit (IC) 320 comprising a substrate 325 having a semiconductor surface 326, such as a silicon surface. In another embodiment the modem 304 is implemented using 2 processor chips, such as 2 DSP chips. As described above, for powerline communication applications, the KA loss reduction algorithm uses information regarding the registered SNs in the powerline communications network to dynamically adjust the KA_TO value used by the KA timer 307.

Communications device 300 also includes an analog from end (AFE) shown as a transceiver (TX/RX) 306 that allows coupling of the communications device 300 to the communications media 340, such as a powerline for powerline communications or the air for wireless communications, to facilitate communications with SNs in the network. For wireless applications, transceiver 306 comprises a wireless transceiver that is coupled to an antenna (not shown). In one embodiment the transceiver 306 comprises an IC separate from IC 320. Besides the DSP noted above, the processor 304a can comprise a desktop computer, laptop computer, cellular phone, smart phone, or an application specific integrated circuit (ASIC).

EXAMPLES

Disclosed embodiments are further illustrated by the following specific Examples, which should not be construed as limiting the scope or content of this Disclosure in any way.

Table 1 below shows KA_TO values dynamically selected based on a disclosed KA_TMO algorithm for various network arrangements for a 4-level network using K=1/6. Each row in the table corresponds to a different time, where node registration and deregistration happens over time interval shown in levels 2, 3 and 4.

| Number of nodes in level 1 | Number of nodes in level 2 | Number of nodes in level 3 | Number of nodes in level 4 | KA_TO value |
|---|---|---|---|---|
| 2 | 2 | 2 | 2 | 128 |
| 2 | 3 | 2 | 2 | 256 |
| 2 | 3 | 2 | 3 | 256 |
| 2 | 3 | 1 | 3 | 128 |

The current KA_TO value can be seen to increase from 128 seconds to 256 seconds, and then decrease to 128 seconds again based on the current registered network arrangement. Disclosed adjustment to the KA_TO value based on the current node arrangement reduces the overall KA traffic compared to conventional KA algorithms, while still being able to detect a connection loss in reasonable time.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of communications in a network having plurality of nodes including a base node (BN) and a plurality of levels (i) each including at least one service node (SN), comprising:
determining a number (Ni(t)) of said SNs registered in each of said plurality of i, and
dynamically adjusting a current Keep Alive time out (KA_TO) value for a KA timer at said BN to an updated KA_TO value based on said Ni(t) and said i.

2. The method of claim 1, wherein said BN transmits KA requests in an ALV_B frame to said SNs up to a predetermined number of times prior to an expiry of said updated KA_TO value.

3. The method of claim 2, further comprising said BN communicating said updated KA_TO value to said SNs in an ALV.TIME field within said ALV_B frame.

4. The method of claim 1, further comprising:
computing a sum over said i of a product of said Ni(t) and i (ΣNi(t)*i) and
comparing said ΣNi(t)*i to at least one predetermined threshold (Th) value to determine said updated KA_TO value.

5. The method of claim 4, wherein said at least one Th value comprises a plurality of said Th values which are configured to form a plurality of Th value ranges, with each said Th value range corresponding to a different candidate KA_TO value, and wherein higher ones of said Th value ranges correspond to higher candidate KA_TO values.

6. The method of claim 5, wherein said predetermined threshold (Th) values are determined as:
said candidate KA_TO value*K, where 0<K<1.

7. The method of claim 1, wherein said network utilizes Orthogonal Frequency-Division Multiplexing (OFDM) signaling.

8. The method of claim 1, wherein said communications comprise powerline communications.

9. The method of claim 1, wherein said communications comprise wireless communications.

10. A modem, comprising:
a processor;
a memory comprising non-transitory machine readable storage, wherein said processor is communicably coupled to access data stored in said memory, wherein said memory stores a Keep Alive (KA) message overhead reduction algorithm and said processor is programmed to implement said KA message overhead algorithm, said KA message overhead algorithm:
generating at least one parameter from data including a number (Ni(t)) of service nodes (SNs) registered in each of a plurality of levels (i) for a communications network having a base node (BN), said BN including a KA timer having a current KA_TO value, and
dynamically calculating an updated KA_TO value for said KA timer based on said Ni(t) and said i.

11. The modem of claim 10, wherein said modem is formed on an integrated circuit (IC) comprising a substrate having a semiconductor surface, and wherein said processor comprises a digital signal processor (DSP).

12. The modem of claim 10, wherein said KA message overhead algorithm further implements:
computing a sum over said i of a product of said Ni(t) and i (ΣNi(t)*i) and
comparing said ΣNi(t)*i to at least one predetermined threshold (Th) value to determine said updated KA_TO value.

13. The modem of claim 12, wherein said at least one Th value comprises a plurality of said Th values which are configured to form a plurality of Th value ranges, with each said Th value range corresponding to a different candidate KA_TO value, and wherein higher ones of said Th value ranges correspond to higher candidate KA_TO values.

14. A communications device, comprising:
a modem, comprising:
a processor;
a memory comprising non-transitory machine readable storage, wherein said processor is communicably coupled to access data stored in said memory, wherein said memory stores a Keep Alive (KA) message overhead reduction algorithm and said processor is programmed to implement said KA message overhead algorithm, said KA message overhead algorithm:
generating at least one parameter from data including a number (Ni(t)) of service nodes (SNs) registered in each of a plurality of levels (i) for a communications network having a base node (BN), said BN including a KA timer having a current KA_TO value, and
dynamically calculating an updated KA_TO value for said KA timer based on said Ni(t) and said i, and
a transceiver communicably coupled to said modem.

15. The communications device of claim 14, wherein said modem is formed on an integrated circuit (IC) comprising a substrate having a semiconductor surface, and wherein said processor comprises a digital signal processor (DSP).

16. The communications device of claim 14, wherein said transceiver comprises a powerline transceiver.

17. The communications device of claim 14, wherein said transceiver comprises a wireless transceiver.

18. The communications device of claim 14, wherein said KA message overhead algorithm further implements:
   computing a sum over said i of a product of said $Ni(t)$ and i ($\Sigma Ni(t)*i$) and comparing said $\Sigma Ni(t)*i$ to at least one predetermined threshold (Th) value to determine said updated KA_TO value.

19. The communications device of claim 18, wherein said at least one Th value comprises a plurality of said Th values which are configured to form a plurality of Th value ranges, with each said Th value range corresponding to a different candidate KA_TO value, and wherein higher ones of said Th value ranges correspond to higher candidate KA_TO values.

* * * * *